(12) United States Patent
Ramachandran et al.

(10) Patent No.: US 8,185,771 B2
(45) Date of Patent: May 22, 2012

(54) CLOCK GENERATION FOR MEMORY ACCESS WITHOUT A LOCAL OSCILLATOR

(75) Inventors: Anand Ramachandran, Chandler, AZ (US); Manoj Chandran, Chandler, AZ (US)

(73) Assignee: NXP B.V., Eindhoven (NL)

( * ) Notice: Subject to any disclaimer, the term of this patent is extended or adjusted under 35 U.S.C. 154(b) by 422 days.

(21) Appl. No.: 12/520,009

(22) PCT Filed: Dec. 20, 2007

(86) PCT No.: PCT/IB2007/055254
§ 371 (c)(1),
(2), (4) Date: Jun. 18, 2009

(87) PCT Pub. No.: WO2008/075311
PCT Pub. Date: Jun. 26, 2008

(65) Prior Publication Data
US 2010/0001786 A1     Jan. 7, 2010

Related U.S. Application Data

(60) Provisional application No. 60/876,314, filed on Dec. 20, 2006.

(51) Int. Cl.
*G06F 1/00* (2006.01)

(52) U.S. Cl. ......... 713/500; 713/600; 713/320; 710/305
(58) Field of Classification Search .......... 713/500–600, 713/320–340; 710/305–306
See application file for complete search history.

(56) References Cited

U.S. PATENT DOCUMENTS

| | | | |
|---|---|---|---|
| 5,513,334 A | 4/1996 | Alexander | |
| 5,841,996 A | 11/1998 | Nolan et al. | |
| 6,112,306 A | 8/2000 | Volk et al. | |
| 6,650,594 B1 | 11/2003 | Lee et al. | |
| 7,194,644 B2 * | 3/2007 | Durand et al. | 713/320 |
| 2002/0078316 A1 | 6/2002 | Nakamura | |
| 2005/0094432 A1 | 5/2005 | Johnson et al. | |
| 2008/0086655 A1 * | 4/2008 | Shipton et al. | 713/503 |

* cited by examiner

*Primary Examiner* — Brian Misiura
*Assistant Examiner* — Kim Huynh

(57) ABSTRACT

A method of accessing electronic memory is provided in electronic circuits where it is desired to lower power consumption and hence there is no active oscillator at the time when access to data within the electronic memory is required. The invention provides a method therefore for accessing the electronic memory from a controller, which generates its own clock signals from a data, communications bus electrically coupled to the controller. Advantageously the method allows for memory access to be continued in integrated circuits where a subset of circuits are powered down to reduce power consumption, and one of the subset of circuits is an oscillator.

23 Claims, 6 Drawing Sheets

FIG. 6

CLOCK GENERATION FOR MEMORY ACCESS WITHOUT A LOCAL OSCILLATOR

FIELD OF THE INVENTION

The invention relates to the field of electronic circuits, and more particularly to power savings for electronic memory circuits.

BACKGROUND OF THE INVENTION

Although processing power and storage capacities have increased beyond all recognition since the first introduction of microprocessors in the 1970s the underlying technology of microcomputers and their operations have remained basically the same. An important element of this underlying operation is the serial presence detect (SPD) performed when a microprocessor or microcomputer is booted (started or restarted). SPD is information stored in a RAM memory module that tells the microcomputer's basic input/output system (BIOS) the module's size, data width, speed, and voltage. The BIOS uses this information to configure the memory properly for reliability and performance. If a memory module does not have SPD, the BIOS assumes the memory module's information. Sometimes this is not problematic but other times, as is common with SDRAM memory, the computer may not boot at all or, when it does boot, the assumed information may cause fatal exception errors.

As such integrated circuits (ICs) have been developed to access the SPD information within RAM memory modules and, as with many integrated circuit technologies, there is commercial benefit of integrating additional functionality within the overall microcomputer into the same semiconductor die as that performing the SPD process. It is therefore common for such SPD circuits to be integrated with a self-contained temperature sensor. This provides advantages such as reduced component count, reduced inventory, smaller microcomputer footprint, and reduced cost. However, the resulting integrated circuit has increased power consumption which whilst not critical for motherboard applications within PCs, is a critical aspect for designers of microcomputers intended for handheld, portable, and remote applications wherein their power is derived primarily from battery modules. Alternatively, employing the IC as part of a common platform for lower manufacturing costs and standardization also suffers the disadvantage of increased power consumption as often all supplied variants of the common platform do not require the full IC functionality.

Adjusting power consumption in the vast majority of prior art multi-function ICs is performed by providing control signaling to the integrated circuit instructing it as to which portions of the IC should be powered and which un-powered. However, in prior art instances of integrated circuits it is common for portions of the IC to be left permanently powered as they are common to more than a single function, for example within an integrated SPD and temperature sensing circuit the oscillator remains powered despite being a major portion of the overall power consumption of the circuit since it is used to produce clocking to access memory within the integrated circuit and by the temperature sensing circuit.

It would be advantageous to overcome some of the aforementioned drawbacks of the prior art.

SUMMARY OF THE INVENTION

In accordance with the invention there is provided an integrated circuit, the integrated circuit comprising a first circuit for supporting a first circuit function, a second circuit for supporting a second circuit function, a digital interface circuit for receiving an oscillator signal from external to the integrated circuit, an oscillator circuit internal to the integrated circuit for providing a first clock signal, and a control circuit. The control circuit for in a first mode of operation enabling the first circuit and providing at least one of the first and second circuits with the first clock signal and in a second mode of operation for disabling the oscillator circuit internal to the integrated circuit, for disabling the second circuit, and for receiving the oscillator signal from external to the integrated circuit and driving the first circuit with the received oscillator signal.

In accordance with another embodiment of the invention there is provided a method of operating an integrated circuit comprising;

(a) providing a first circuit, the first circuit for supporting a first circuit function;

(b) providing a second circuit, the second circuit for supporting a second circuit function;

(c) providing a digital interface circuit, the digital interface circuit for receiving an oscillator signal from external to the integrated circuit;

(d) providing an oscillator circuit, the oscillator circuit internal to the integrated circuit and for providing a first clock signal; and (e) providing a control circuit, the control circuit for establishing a first mode of operation, the first mode of operation comprising at least enabling the first circuit and providing at least one of the first and second circuits with the first clock signal, and a second mode of operation, the second mode of operation comprising at least disabling the oscillator circuit internal to the integrated circuit, disabling the second circuit, and receiving the oscillator signal from external to the integrated circuit and driving the first circuit with the received oscillator signal.

In accordance with another embodiment of the invention there is provided a computer readable medium, the computer readable medium having stored therein data according to a predetermined computing device format. The execution of the data by a suitable computing device resulting an integrated circuit being provided comprising a first circuit for supporting a first circuit function, a second circuit for supporting a second circuit function, a digital interface circuit for receiving an oscillator signal from external to the integrated circuit, an oscillator circuit internal to the integrated circuit for providing a first clock signal, and a control circuit. The control circuit for in a first mode of operation enabling the first circuit and providing at least one of the first and second circuits with the first clock signal and in a second mode of operation for disabling the oscillator circuit internal to the integrated circuit, for disabling the second circuit, and for receiving the oscillator signal from external to the integrated circuit and driving the first circuit with the received oscillator signal.

BRIEF DESCRIPTION OF THE DRAWINGS

Exemplary embodiments of the invention will now be described in conjunction with the following drawings, in which:

FIG. 6 illustrates an exemplary timing diagram for a selective address read from an EEPROM according to the exemplary first embodiment of the invention.

DETAILED DESCRIPTION OF EMBODIMENTS OF THE INVENTION

Figure 1A:
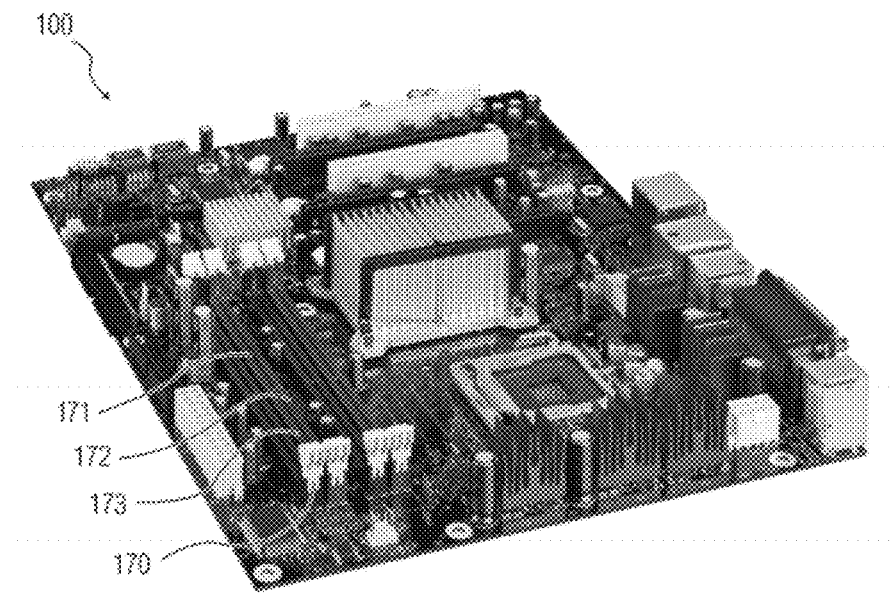
FIG. 1A is a photograph of a typical PC motherboard showing the multiple insertion points for RAM memory modules.

FIG. 1A is a photograph of a typical PC motherboard 100 showing multiple insertion points for RAM memory modules. Shown is a 184-pin DIMM socket 170, being one of four in this typical PC motherboard. Key elements to the 184-pin DIMM socket 170 are the first contact section 170, the central ridge 172 and the second contact section 173. The first and second contact sections 170 and 173 provide electrical contact to the 184 pads on the RAM memory module 160, shown in FIG. 2, when inserted into the 184-pin DIMM socket 170. The single central ridge 172 prevents the incorrect insertion of other RAM memory modules.

Replacement of the 184-pin DIMM socket 170 with others supporting different memory modules is also possible, either in part or completely. As a result the PC motherboard 100 optionally supports many different memory formats, physical sizes and memory capacities. Parallel presence detect, which was replaced by SPD, addressed this problem.

Figure 1B:
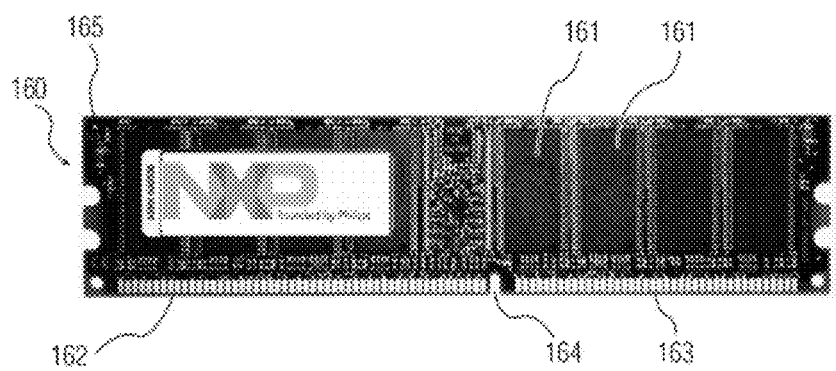
FIG. 1B is a photograph of a standard DRAM memory module fitting the multiple insertion points for RAM memory modules on the PC motherboard of FIG. 1.

FIG. 1B is a photograph of a standard DRAM memory module 160 fitting the 184-pin DIMM socket 170 on the PC motherboard 100 of FIG. 1 is shown. As shown the standard DRAM memory module 160 comprises a circuit 165 onto which a number of surface mount memory chips 161 are mounted and electrically interconnected. As shown there are 8 surface mount memory chips 161 such that if each is individually 128 k then the standard DRAM memory module 160 provides 1024 k (1 Mb) of RAM memory for the microcomputer. If each surface mount memory chips 161 is 256 k then the standard DRAM memory module 160 provides 2048 k (2 Mb) of RAM.

Also shown are the first electrical contact 162, which is an array of 52 pads on each side of the circuit 165, and the second electrical contact 163, which is an array of 40 pads on each side of the circuit 165. As such each side of the circuit 165 provides 92 pads, such that overall the circuit 165 has 184 pads to match the 184 contact pins in the 184-pin DIMM socket 170 of FIG. 1. Also shown is the slot 164 within the circuit 165, which matches the position and depth of the single central ridge 172 of the 184-pin DIMM socket 170 of FIG. 1.

As semiconductor manufacturing processes improve the capacity of each memory IC assembled within each surface mount memory chips 161 is optionally increased. Equally for other applications the RAM modules are optionally smaller in memory capacity as small modules remain commercially available.

Figure 2:
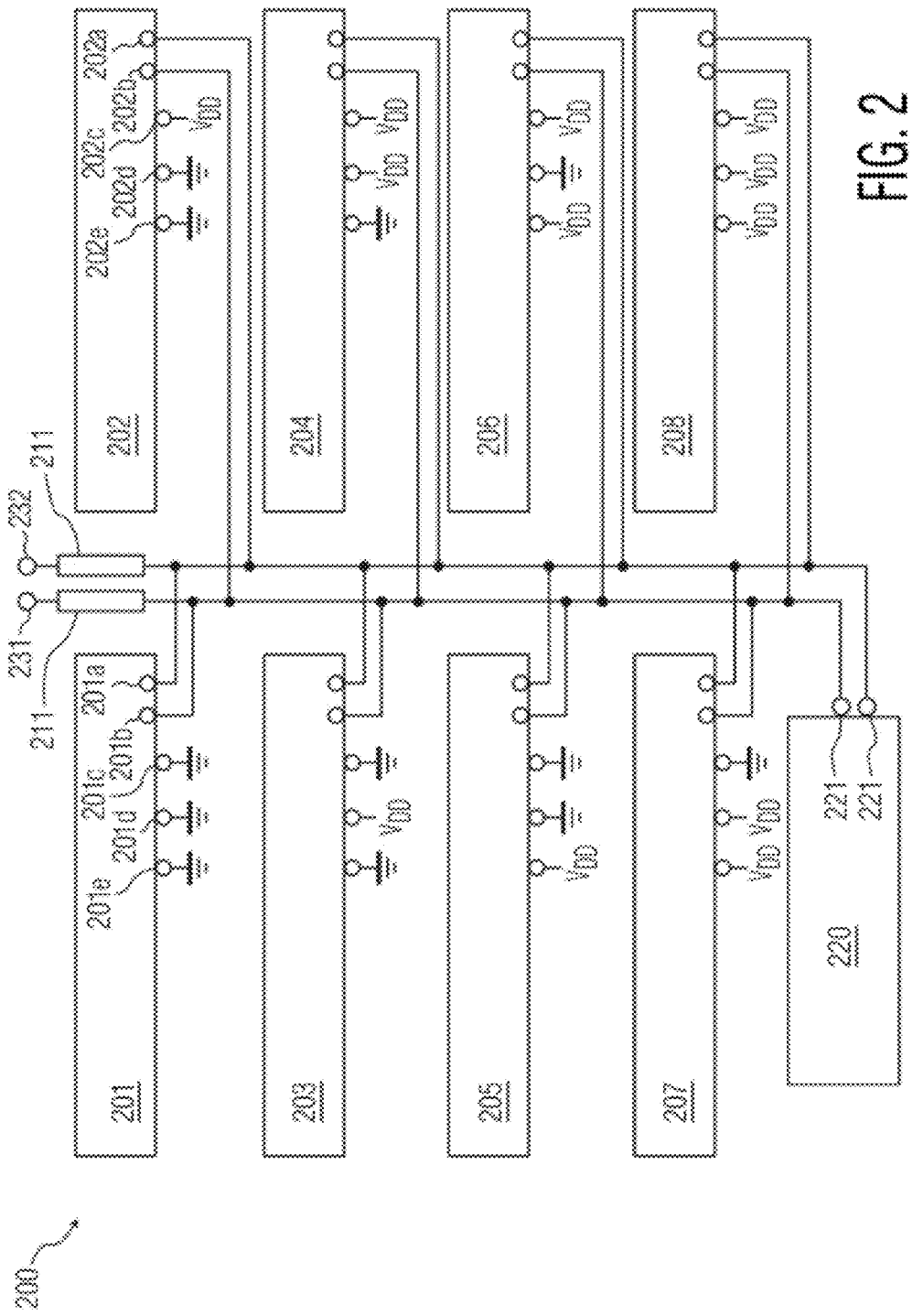
FIG. 2 illustrates the standard 2-wire communications from the SPD circuit to the RAM memory modules.

FIG. 2 illustrates the standard 2-wire communications from the SPD circuit 220 to the RAM memory modules 201 through 207. The SPD circuit 220 forms typically a single 6 or 8-pin surface mount package with a footprint of 2-3 mm on each side. As such it forms a very small element of the PC motherboard 100 of FIG. 1, which being an industry standard ATX design has dimensions 295 mm by 244 mm (11.6" by 9.6") and is generally double side populated with electronics. As such the SPD circuit 220 forms about 0.01% of the ATX PC motherboard 100 footprint but without it the board cannot function.

The SPD circuit 220 operates using the Inter-Integrated Circuit (I2C) 2-wire bus interface standard and hence has clock and data ports 221 and 222, respectively, providing I2C signaling to the RAM memory modules 201 through 207. The RAM memory modules 201 through 207 comply with the Joint Electron Device Engineering Council (JEDEC) standard, which require certain parameters to be placed in the lower 128 bytes of the Electrically Erasable Programmable Read-Only Memory (EEPROM) located on each of the RAM memory modules 201 through 207. These bytes contain timing parameters, manufacturer, serial number, and other useful information about the module. The JEDEC standard also denotes which two contacts of the RAM memory modules 201 through 207 are employed for the SPD communications.

The I2C communications from the SPD circuit 220 comprise a serial signal clock (SCL) provided from the clock port 221 and a serial data input/output bus (SDA) electrically connected to the data port 222. The SCL is communicated to each of the RAM memory modules 201 through 207 via a first contact, which for simplicity is shown only for the first and second memory modules 201 and 202, respectively. As such, the SCL signal is provided to the ports 201a and 202a of the first and second memory modules 201 and 202, respectively. Equally the SDA is provided to the ports 201b and 202b of the first and second memory modules 201 and 202, respectively. Each of the SCL and SDA lines are connected via load resistors 211 to a power supply VDD at terminations 231 and 232, respectively. The address of each RAM memory module 201 through 207 is established by connecting three address pins, SA0 201c and 202c, SA1 201d and 202d, and SA2 201e and 202e to either a power supply rail $V_{DD}$ or ground. As such the addresses for the RAM memory modules shown in Table 1.

TABLE 1

| RAM memory | DIMM position | Address |
| --- | --- | --- |
| 201 | 0 | 000 |
| 202 | 1 | 001 |
| 203 | 2 | 010 |
| 204 | 3 | 011 |
| 205 | 4 | 100 |
| 206 | 5 | 101 |
| 207 | 6 | 110 |
| 208 | 7 | 111. |

In operation each RAM memory module 201 through 207 has a DIMM position established by the 184-pin DIMM socket 170 it is inserted into on the PC motherboard 100. The SPD circuit 220 then communicates with each RAM memory module 201 through 207 and extracts memory data therefrom. The memory data typically comprises 255 bytes of data of which exemplary bytes are shown in Table 2.

TABLE 2

| | |
| --- | --- |
| 0 | Defines number of bytes written into serial memory by manufacturer |
| 1 | Total number of SPD memory bytes |
| 2 | Fundamental memory type (FPM or EDO) |
| 3 | Number of row addresses on the memory device |
| 4 | Number of column addresses on memory device |
| 5 | Number of physical banks on this memory device |
| 6 | Data width on this module |

TABLE 2-continued

7  Data width (continued)
8  Module voltage interface level

Figure 3:
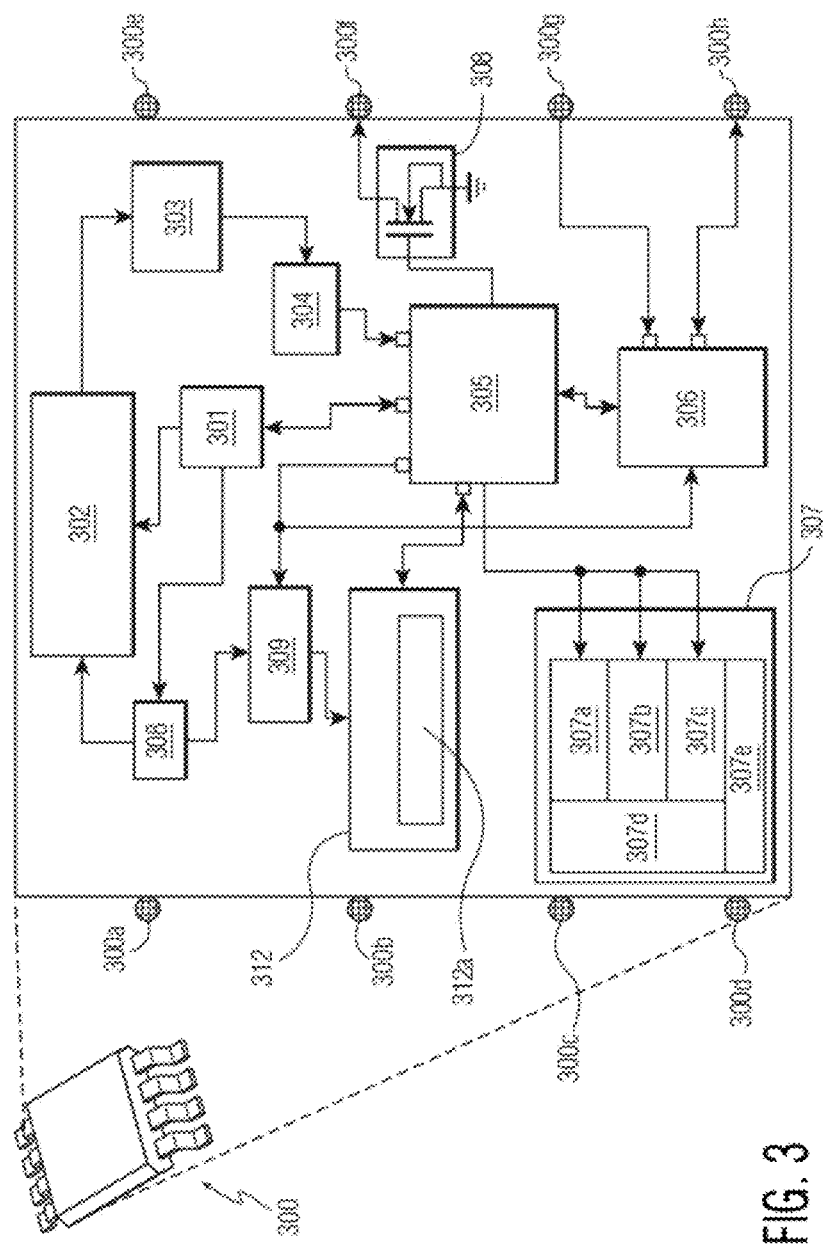
FIG. 3 illustrates schematically an exemplary embodiment of the invention within a combined SPD and temperature sensor IC.

FIG. 3 illustrates schematically an exemplary embodiment of the invention within a combined I2C SPD and temperature sensor IC 300. Shown is a surface mount 8-pin package variant of the packaging for a combined SPD and temperature sensor IC 300. Shown within the combined SPD and temperature sensor IC 300 is the ΣΛ temperature sensor 302 including bias circuit 302a, band gap reference circuit 302b, oscillator 302c, and power-on reset circuit 302d, all of which are coupled with ΣΛ modulator 302e. An output signal from the ΣΛ modulator 302e is provided to an 11-bit analog-to-digital converter 303. In operation the ΣΛ temperature sensor 302 continuously monitors and updates its temperature readings, the readings then converted to digital data and transferred to the data temperature register 304 where the data is stored in an 11-bit 2's complement format.

The digital data stored within the data temperature register 304 are read by control logic block 305 and fed to a data register block 307 wherein the temperature data extracted from the data temperature register 304 is compared with critical temperature using the critical register 307a, over temperature with the over register 307b, and under temperature with the under register 307c. Additionally the data register block 307 has a configuration block 307e and a security lock 307f. The results from the register comparisons are returned to the control logic block 305, and are optionally provided as decision data through the control I2C bus of the SPD and temperature sensor IC 300, which is implemented with bit A0 being presented at pin 300a, bit A1 being presented at pin 300b, and bit A2 being presented at pin 300c.

Additionally the control logic block 305 presents an event output signal at pin 300f, which is provided via driver 308. According to the control logic block 305 decision the event output signal at pin 300f is optionally used as an on/off switching signal such as for a fan or as an interrupt to a host. Finally, the control loop for the temperature segment of the SPD and temperature sensor IC 300 employs an SPD power management circuit 301 which communicates to/from the central logic block 305 and enables/disables the oscillator 302c and the band gap reference circuit 302b portions of the ΣΛ temperature sensor 302 as well as the power-on reset circuit 302d.

In operation the SPD power management circuit 301 determines a mode of operation of the combined SPD and temperature sensor IC 300 and allows it to manage power consumption based upon the operation of the control functions in two modes, an SPD only mode, and an SPD with temperature sensor. Within the SPD only mode, the SPD power management circuit 301 disables the oscillator 302c and band gap reference circuit 302b portions of the ΣΛ temperature sensor 302. Power dissipation in the exemplary circuit is mainly due to the on-chip oscillator, which is solely used for temperature conversions and the associated bandgap circuitry. Lower power consumption of the combined SPD and temperature sensor IC 300 is achieved by turning off these elements.

When the combined SPD and temperature sensor IC 300 is operating in the SPD with temperature sensor mode the SPD power management circuit 301 enables the oscillator 308 and band gap reference circuit 302b. In this exemplary embodiment the decision as to which mode to operate the combined SPD and temperature sensor IC 300 in is established from a simple adjustment of the power supply $V_{DD}$ connection through pin 300e. This removes the requirements for controlling the combined SPD and temperature sensor IC 300 through its I2C control bus as implemented through bits A0, A1, and A2 that are presented at pins 300a, 300b, and 300c, respectively. Alternatively, another method of mode selection is used.

Now referring to the SPD function of the SPD and temperature sensor IC 300, the control block 305 communicates with the 2-wire I2C interface 306, which receives the serial clock signal (SCL) coupled at the SCL pin 300g and serial data signal (SDA) at SDA pin 300h. Received data in respect of memory modules is optionally stored within an EEPROM 312 before being transmitted through the control I2C bus of the SPD and temperature sensor IC 300 as implemented through bits A0, A1, and A2 which are presented at pins 300a, 300b, and 300c, respectively.

As shown, a part of the EEPROM 312, reserved memory 312a, is write-protected in the control software allowing it to be configured as permanent or reversible write-protect memory for storing data. The data optionally include the settings for the critical register 307a, over register 307b, and under register 307c, as well as device identity, and settings for configurable hysteresis. The final two pins of the SPD and temperature sensor IC 300, which have not been outlined so far, are the $V_{SS}$ connection through pin 300d, typically ground, and $V_{DD}$ connection through pin 300e.

The optional storage of the received memory module data is optionally stored within the EEPROM 312 when the combined SPD and temperature sensor IC 300 is operating at a power supply voltage $V_{DD}$, as applied at pin 300e, that supports both read and write operations into the EEPROM 312. At lower power supply voltages the combined SPD and temperature sensor IC 300 supports only read operations from the EEPROM 312. Hence, configuration settings are extractable from the EEPROM 312 by the central logic block 305 allowing operation of the combined SPD and temperature sensor IC 300 as designed in an SPD only mode, but not allowing a write operation into the EEPROM 312. When such write operations into the EEPROM 312 are enabled the EEPROM 312 allows storage of memory module data and temperature events.

In prior art approaches to such electrical circuits power consumption was reduced by turning off the band gap reference circuit 302b, as there was no means to operate the EEPROM 312 without the oscillator 308. Hence, power consumption is not optimized to the fullest. In the exemplary embodiment of the invention the combined SPD and temperature sensor IC 300 contains an additional clock generator 309. This clock generator 309 generates a read clock signal for the EEPROM 312 read operations from the SCL and SDA data received in the SPD process. If the combined SPD and temperature sensor IC 300 is operating in SPD only mode then this generated clock signal is employed in EEPROM 312 read operations. If the combined SPD and temperature sensor IC 300 is operating in the dual mode as temperature sensor and SPD then whilst the clock generator 309 still generates a read clock signal but this is discarded and the output of the oscillator 308 is employed instead. As with the SPD power management circuit 301 the clock generator 309 is designed to select the clock signal provided to the EEPROM 312 based upon the power supply voltage $V_{DD}$.

Exemplary power consumption reduction when operating the combined SPD and temperature sensor IC 300 as outlined in the exemplary embodiment in an SPD only mode is achievable by other adjustments to the operating conditions of circuit elements. Examples include but are not limited to adding other circuit functional blocks into the powered off state such as data register block 307, 11-bit analog-to-digital converter 303, and data temperature register 304.

Generation of the read commands for the EEPROM 312 is performed directly from other circuitry rather than generating a clock signal in the event the oscillator is powered-down as shown in the exemplary embodiment. The read commands and timing are generated by an I2C master controller directly, for example in the exemplary embodiment of FIG. 3 the 2-wire I2C interface 306 and an external I2C device interfacing with the SPD and temperature sensor IC 300 via the control I2C bus through bits A0 on pin 300a, A1 on pin 300b, and A2 on pin 300c. Alternatively the read commands and timing are generated by other control logic circuits within the overall circuit, for example the control logic block 305 of the exemplary embodiment in FIG. 3.

Figure 4:
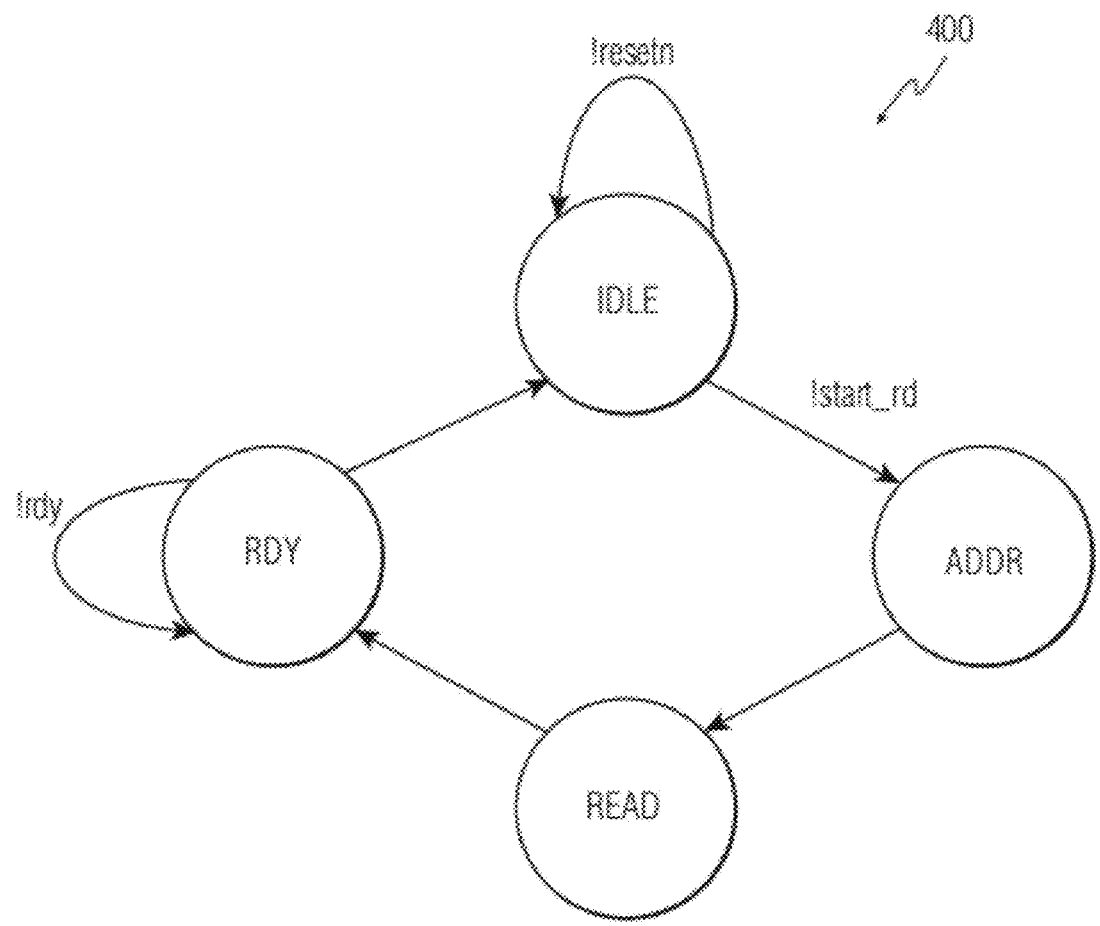
FIG. 4 illustrates schematically an exemplary state flow diagram for an exemplary first embodiment of the invention.

FIG. 4 illustrates schematically an exemplary embodiment of logic used within a state machine 400 forming the clock generator 309 to generate the EEPROM read signals for an EEPROM, such as EEPROM 312 of FIG. 3. As shown the state machine has four states, namely IDLE, ADDR, READ and RDY. To perform a read operation the state machine cycles through all the four states asserting the necessary read signals in the appropriate states. Each state functions as outlined below:

IDLE: This is the idle state of the state machine 400, and if there are no read requests from the master controller the state machine stays in the IDLE state. However, a read request being issued by the master controller results in the state machine going to the next state, the ADDR state.

ADDR: In this state the state machine 400 assigns the read address on the address bus to the EEPROM and on the next clock cycle moves to the READ state.

READ: The EEPROM has its read strobe asserted in this state. It is asserted for one SCL clock cycle. This starts the read process of the EEPROM. The state machine goes to the next state, RDY, on the next clock edge.

RDY: The state machine 400 waits for the read to complete in this state. If the read is completed, a data sample strobe is asserted and the data is sampled on the next SCL clock. This read data is stored in a data register. The state machine then returns to the IDLE state.

Within the state sequence of the state machine 400 shown in FIG. 4 three other signals are presented in the control of the state machine transitions between states. These are:

!resetn: This provides for the loop of the state machine 400 such that it is maintained within the IDLE state idle whilst there are no read requests from the master controller.

!start_rd: This commands issued by the master controller results in the state machine transition from IDLE to ADDR. As such it is the EEPROM read request from the master controller.

!rdy: This signal provides for the loop of the state machine 400 such that it maintained in this state until there is an acknowledgement from the EEPROM that the read is complete.

Figure 5:
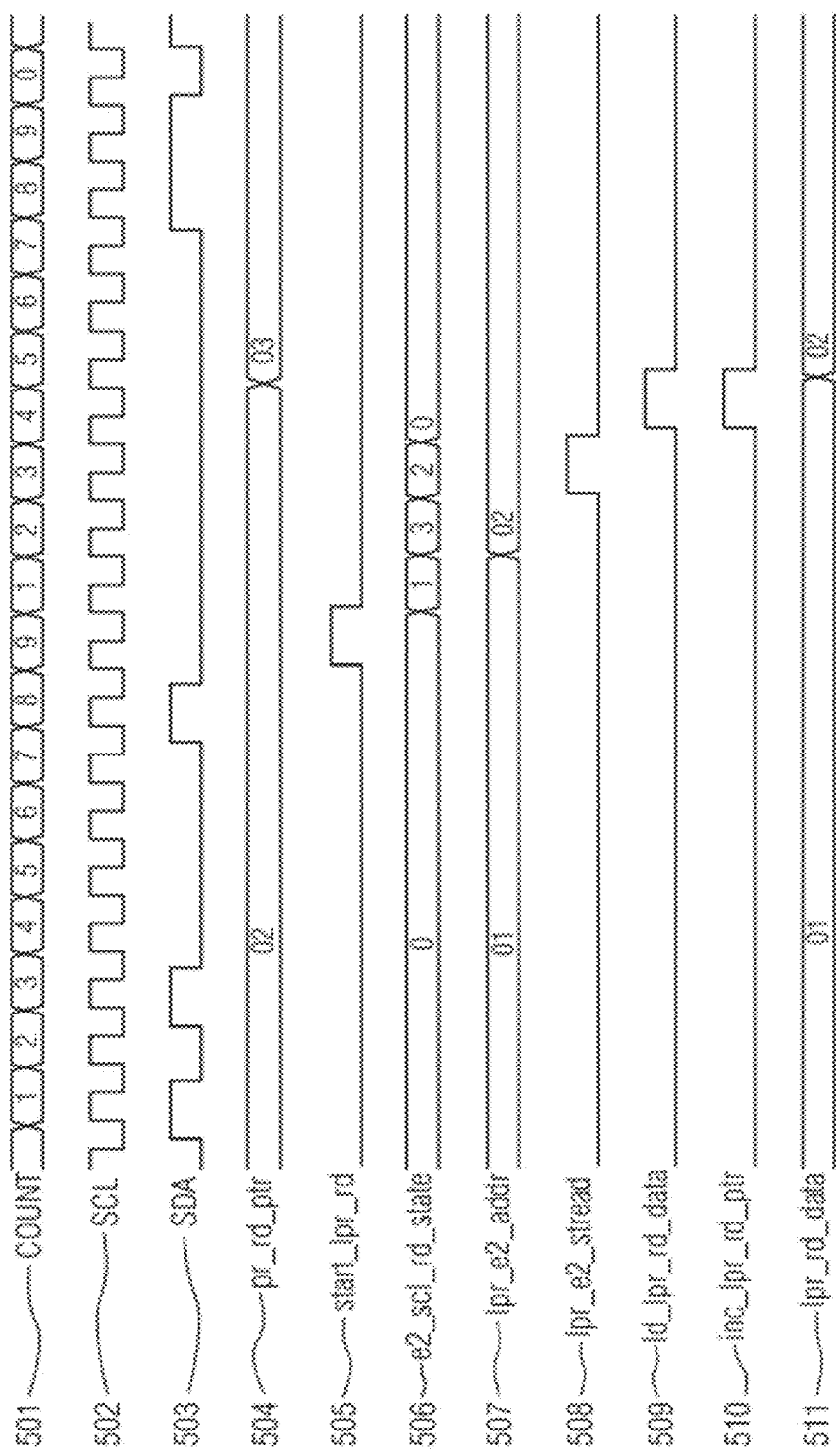
FIG. 5 illustrates an exemplary timing diagram for a current address read from an EEPROM according to the exemplary first embodiment of the invention.
Figure 6:
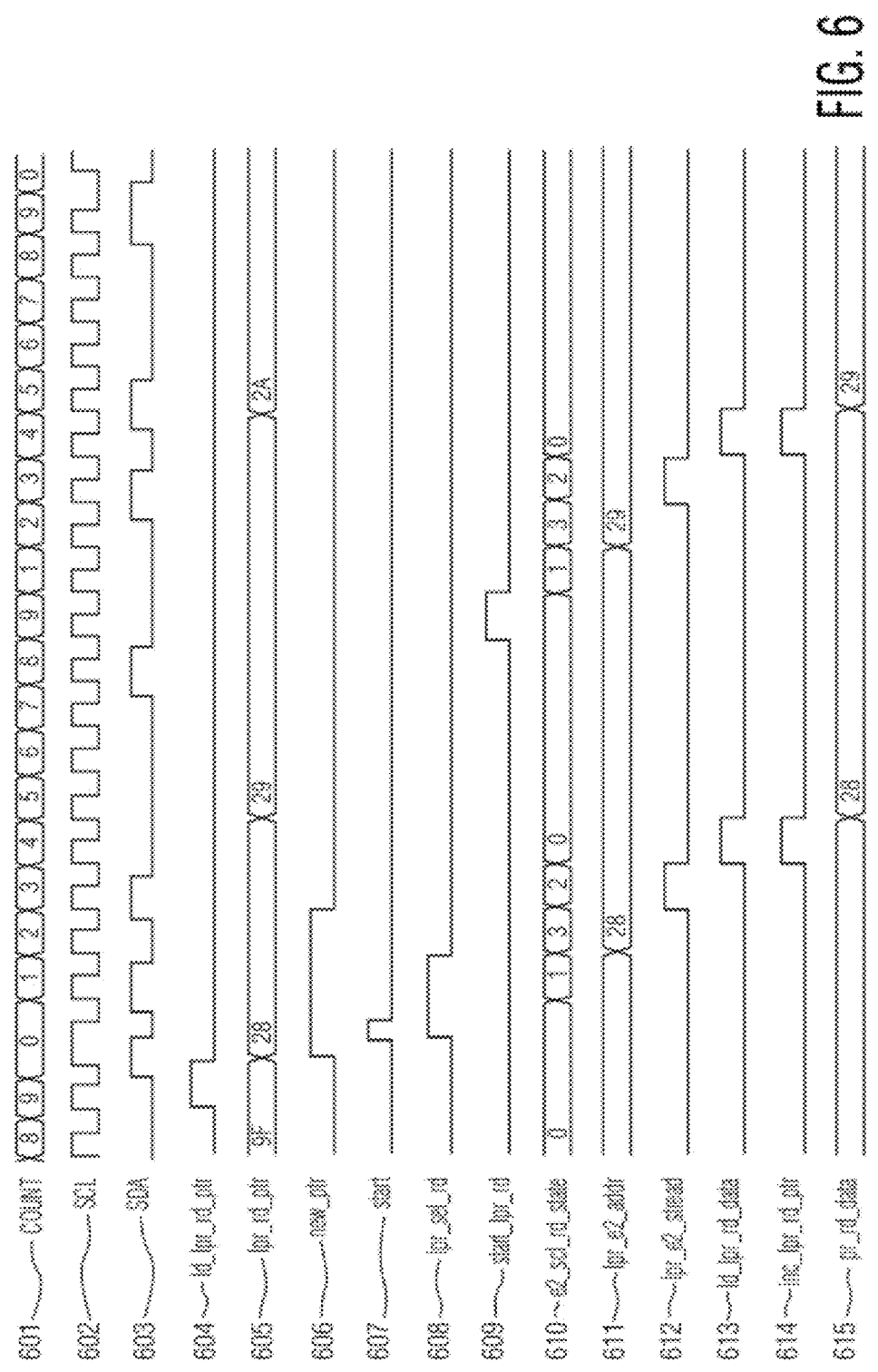

In the exemplary embodiment of the state machine 400 where the state machine is part of an I2C master controller the ADDR state may be one of two different types of EEPROM read, being current address read (CAR) or selective address read (SAR) which are explained with references to FIGS. 5 and 6, respectively.

In the case of current address read the master controller addresses the EEPROM with a read request and expects the data from the location pointed to by the internal address pointer of the EEPROM. As such the master controller does not provide the read address. When such a request is issued by the master controller the data that is currently in the data register is shifted out on the I2C bus and at the same time by using the SCL clocks provided from the master controller to read the data stored within the next EEPROM address is read. In this manner if the master controller performs another CAR operation then the data is readily available to be shifted out on the I2C interface.

TABLE 3

| 501 | Count - | To mark the SCL cycles |
| 502 | SCL - | I2C Serial Clock |
| 503 | SDA - | I2C Serial Data |
| 504 | lpr_rd_ptr | Internal read address pointer |
| 505 | Start_lpr_rd | Indicates a read request from the master controller |
| 506 | e2_scl_rd_state | State machine state register |
| 507 | lpr_e2_addr | EEPROM address bus |
| 508 | lpr_e2_stread | Read strobe |
| 509 | ld_lpr_rd_data | Sample read data strobe |
| 510 | inc_lpr_rd_ptr | Increment read pointer after the current EEPROM read is complete |
| 511 | lpr_rd_data | Read data register |

This CAR operation is explained with reference to the CAR timing diagram as shown in FIG. 5. In respect of the CAR timing diagram of FIG. 5 the descriptions in Table 3 relate to the signals shown. As shown in FIG. 5, there is a count 501 for ease of reference in respect to time slots within the process, the I2C serial clock represented by SCL 502 and the I2C serial data as represented by SDA 503. In the first nine clock cycles of the SCL 502 the EEPROM is addressed for an EEPROM read operation, the $8^{th}$ cycle of the SDA 503 being HIGH and indicating a read cycle. The next nine clock cycles of the SCL 502 are where the read data is shifted out. It can be seen that while the read data is being shifted out the state machine is cycling through the states 0 IDLE, 1 ADDR, 3 READ, 2 RDY, 0 IDLE and that the data within the next memory location of the EEPROM is read.

During a SAR operation upon an EEPROM the I2C master controller provides the read address of the location to be read. In this case the I2C master controller updates the read pointer with the EEPROM address from which data is to be read and follows it by issuing a read request to the EEPROM. This SAR operation is explained with reference to the SAR timing diagram as shown in FIG. 6. In respect of the SAR timing diagram of FIG. 6 the descriptions provided in Table 4 relate to the signals shown.

TABLE 4

| 601 | Count - | To mark the SCL cycles |
| 602 | SCL - | I2C Serial Clock |
| 603 | SDA - | I2C Serial Data |
| 604 | ld_lpr_rd_ptr | Load the read pointer with the read address from master |
| 605 | lpr_rd_ptr | Internal read address pointer |
| 606 | new_ptr | Indicates that the master has updated the pointer register with a new address |
| 607 | start | I2C start condition |
| 608 | lpr_sel_rd | Start selective read of the EEPROM using the location pointed to by the read pointer |
| 609 | start_lpr_rd | Indicates a read request from the master controller |
| 610 | e2_scl_rd_state | State machine state register |
| 611 | lpr_e2_addr | EEPROM address bus |
| 612 | lpr_e2_stread | Read strobe |
| 613 | ld_lpr_rd_data | Sample read data strobe |
| 614 | inc_lpr_rd_ptr | Increment read pointer after the current EEPROM read is complete |
| 615 | lpr_rd_data | Read data register |

As can be seen from FIG. 6, the I2C master controller performs the read operation of the EEPROM during the period where the I2C master controller is addressing the part for a read operation. After the pointer register is updated, the read logic waits for a start condition from the I2C master controller to initiate the read request. In this manner the read data is ready prior to the I2C master controller completing the addressing phase of the SAR. In this example the basis for read logic waiting until the start condition is triggered is that following a start condition the I2C master controller issues 9 clock pulses on SCL 602 and hence the read operation is safely completed during this time. It would be apparent to one skilled in the art that the exemplary embodiments outlined, for the CAR and SAR in FIGS. 5 and 6, respectively, in performing EEPROM reads without and oscillator 308 clock running offer an advantage in using the clock SCL 502. Firstly, there are power savings since the on-chip clock is disabled. Secondly, the resulting design is still fully synchronous using registers. As such standard digital design techniques of clock tree synthesis and static timing analysis are applicable and ensure robust operation of the design.

It would also be apparent to one skilled in the art that the clock signal SCL 502 is useful for replacing the oscillator 308 during operation in an SPD only mode of the combined SPD and temperature sensor IC 300. As such other embodiments employing clock signals extracted from I2C interfaces are possible using either operations controlled from an I2C master controller or other related or unrelated circuit logic.

Numerous other embodiments may be envisaged without departing from the scope of the invention.

The invention claimed is:

1. An integrated circuit comprising:
   (a) a first circuit for supporting a first circuit function;
   (b) a second circuit for supporting a second circuit function;
   (c) a digital interface circuit for receiving an oscillator signal from external to the integrated circuit;
   (d) an oscillator circuit internal to the integrated circuit for providing a first clock signal; and
   (e) a control circuit for in a first mode of operation enabling the first circuit and providing at least one of the first and second circuits with the first clock signal and in a second mode of operation for disabling the oscillator circuit internal to the integrated circuit, for disabling the second circuit, and for receiving the oscillator signal from external to the integrated circuit and driving the first circuit with the received oscillator signal,
   wherein the first circuit comprises a serial presence detect circuit configured to perform a serial presence detect operation.

2. An integrated circuit according to claim 1 wherein, the first circuit comprises a memory circuit; and driving the first circuit comprises operating the memory circuit.

3. An integrated circuit according to claim 1 wherein, the digital interface circuit supports communications according to a digital communications protocol, the digital communications protocol being at least one of Inter-Integrated Circuit, Universal Serial Bus, System Management Bus, PMCIA, physical Ethernet, wireless Ethernet, PCI, SCI, SCSI, IEEE 488, RS-232, RS-422, RS-423, and SPI.

4. An integrated circuit according to claim 1 wherein, the digital interface circuit is an Inter-Integrated Circuit.

5. An integrated circuit according to claim 1 wherein, the first circuit comprises at least a phase locked loop, the phase locked loop synchronized in dependence upon at least the received oscillator signal.

6. An integrated circuit according to claim 5 wherein, the digital interface circuit supports communications according to a digital communications protocol, the digital communications protocol being at least one of Inter-Integrated Circuit, Universal Serial Bus, System Management Bus, PMCIA, physical Ethernet, wireless Ethernet, PCI, SCI, SCSI, IEEE 488, RS-232, RS-422, RS-423, and SPI.

7. An integrated circuit according to claim 5 wherein, the digital interface circuit is an Inter-Integrated Circuit.

8. An integrated circuit according to claim 2 wherein, the memory circuit is at least one of random access memory, read only memory and flash memory.

9. An integrated circuit according to claim 1 wherein, at least one of the first circuit, second circuit, digital interface circuit, oscillator circuit and control circuit is an integrated circuit, the integrated circuit being manufactured using a semiconductor technology based upon at least one of silicon, silicon-germanium, gallium arsenide, indium phosphide, gallium nitride and polymers.

10. A method comprising:
   (a) providing a first circuit, the first circuit for supporting a first circuit function;
   (b) providing a second circuit, the second circuit for supporting a second circuit function;
   (c) providing a digital interface circuit, the digital interface circuit for receiving an oscillator signal from external to the integrated circuit; (d) providing an oscillator circuit, the oscillator circuit internal to the integrated circuit and for providing a first clock signal; and
   (e) providing a control circuit, the control circuit for establishing a first mode of operation, the first mode of operation comprising at least enabling the first circuit and providing at least one of the first and second circuits with the first clock signal, and a second mode of operation, the second mode of operation comprising at least disabling the oscillator circuit internal to the integrated circuit, disabling the second circuit, and receiving the oscillator signal from external to the integrated circuit and driving the first circuit with the received oscillator signal,
   wherein driving the first circuit comprises providing a serial presence detect operation.

11. A method according to claim 10 wherein, providing the first circuit comprises providing a memory circuit; and driving the first circuit comprises operating the memory circuit.

12. A method according to claim 10 wherein, providing the digital interface circuit comprises providing an interface supporting a digital communications protocol, the digital communications protocol being at least one of Inter-Integrated Circuit, Universal Serial Bus, System Management Bus, PMCIA, physical Ethernet, wireless Ethernet, PCI, SCI, SCSI, IEEE 488, RS-232, RS-4227, RS-423, and SPI.

13. A method according to claim 10 wherein, providing the digital interface circuit comprises providing an Inter-Integrated Circuit.

14. A method according to claim 10 wherein, driving the first circuit comprises providing at least a phase locked loop and synchronizing the phase locked loop in dependence upon at least the received oscillator signal.

15. A method according to claim 14 wherein, providing the digital interface circuit comprises providing an interface supporting a digital communications protocol, the digital communications protocol being at least one of Inter-Integrated Circuit, Universal Serial Bus, System Management Bus, PMCIA, physical Ethernet, wireless Ethernet, PCI, SCI, SCSI, IEEE 488, RS-232, RS-422, RS-423, and SPI.

16. A method according to claim 14 wherein, providing the digital interface circuit comprises providing an Inter-Integrated Circuit.

17. A method according to claim 11 wherein, providing the memory circuit comprises providing at least one of random access memory, read only memory and flash memory.

18. A method according to claim 10 wherein, providing at least one of the first circuit, second circuit, digital interface circuit, oscillator circuit and control circuit comprises providing an integrated circuit, the integrated circuit being manufactured using a semiconductor technology based upon at least one of silicon, silicon-germanium, gallium arsenide, indium phosphide, gallium nitride and polymers.

19. A computer readable medium having stored therein data according to a predetermined computing device format, and upon execution of the data by a suitable computing device an integrated circuit is provided, comprising:
(a) a first circuit for supporting a first circuit function;
(b) a second circuit for supporting a second circuit function;
(c) a digital interface circuit for receiving an oscillator signal from external to the integrated circuit;
(d) an oscillator circuit internal to the integrated circuit for providing a first clock signal; and
(e) a control circuit for in a first mode of operation enabling the first circuit and providing at least one of the first and second circuits with the first clock signal and in a second mode of operation for disabling the oscillator circuit internal to the integrated circuit, for disabling the second circuit, and for receiving the oscillator signal from external to the integrated circuit and driving the first circuit with the received oscillator signal,
wherein the first circuit comprises a serial presence detect circuit configured to perform a serial presence detect operation.

20. A computer readable medium according to claim 19 wherein; the design of the integrated circuit comprises a memory circuit.

21. A computer readable medium having stored therein data according to a predetermined computing device format, and upon execution of the data by a suitable computing device an integrated circuit is provided, comprising:
(a) a first circuit for supporting a first circuit function;
(b) a second circuit for supporting a second circuit function;
(c) an Inter-Integrated Circuit interface circuit for receiving a data clock signal from external to the integrated circuit;
(d) an oscillator circuit internal to the integrated circuit for providing a first clock signal; and
(e) a control circuit for in a first mode of operation enabling the first circuit and providing at least one of the first and second circuits with the first clock signal and in a second mode of operation for disabling the oscillator circuit internal to the integrated circuit, for disabling the second circuit, and for receiving the oscillator signal from external to the integrated circuit and driving the first circuit with the received data clock signal,
wherein driving the first circuit comprises providing a serial presence detect operation.

22. The integrated circuit of claim 2, wherein the serial presence detect circuit is further configured to provide information with respect to a size, a data width, a speed and a voltage of the memory circuit of the first circuit.

23. The method of claim 11, wherein the serial presence detect operation provides information with respect to a size, a data width, a speed and a voltage of the memory circuit of the first circuit.

* * * * *